Oct. 7, 1952  H. TIMPNER  2,612,793
HOLE SPACING AND CENTERING DEVICE
Filed Nov. 17, 1950   2 SHEETS—SHEET 1
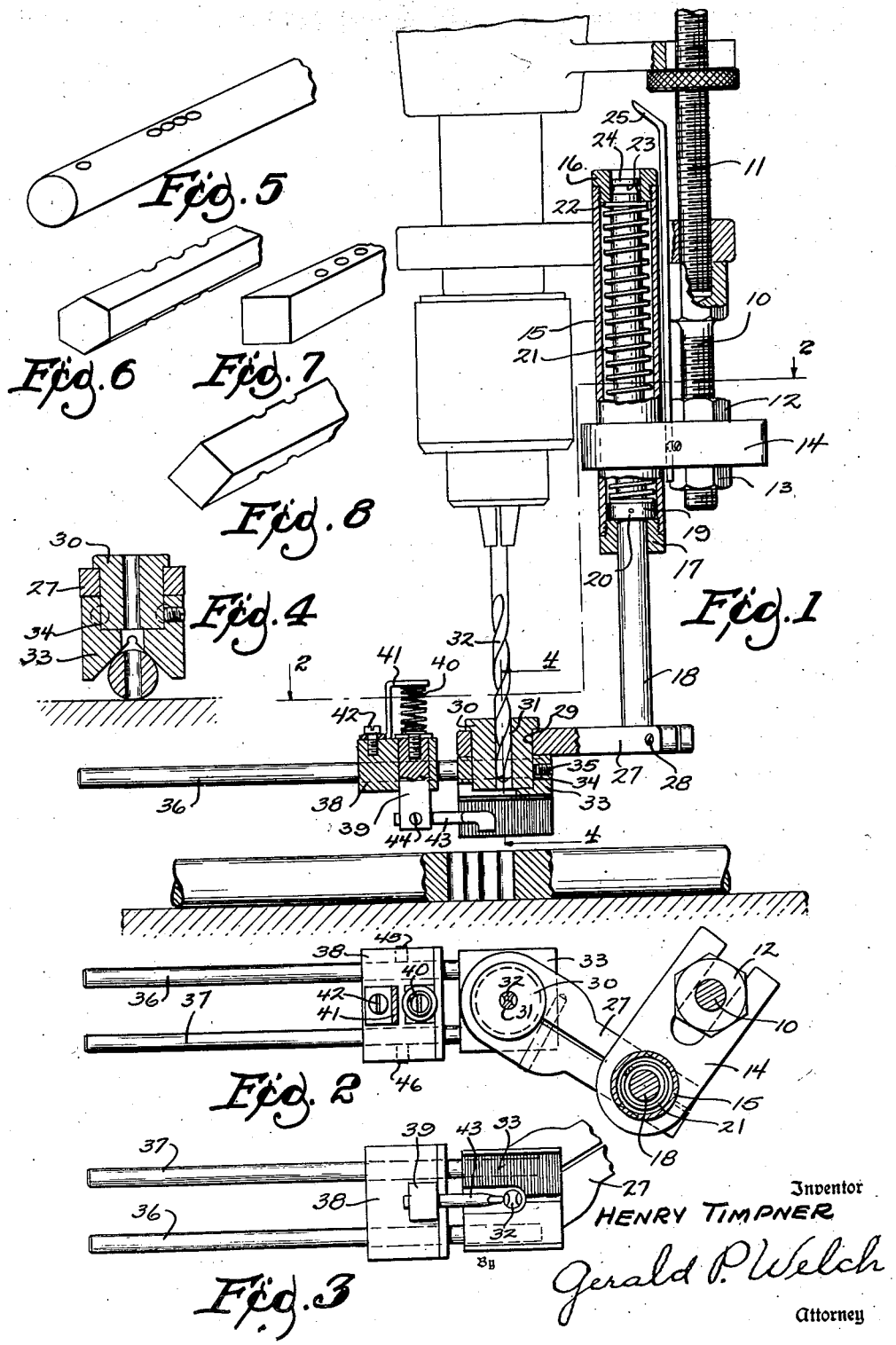
Inventor
HENRY TIMPNER
Gerald P. Welch
Attorney

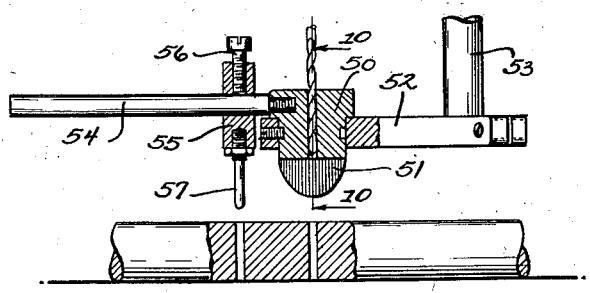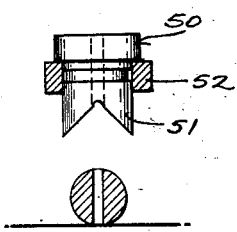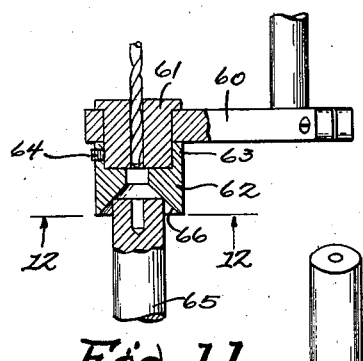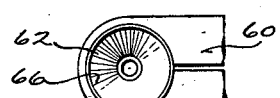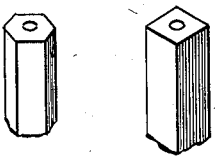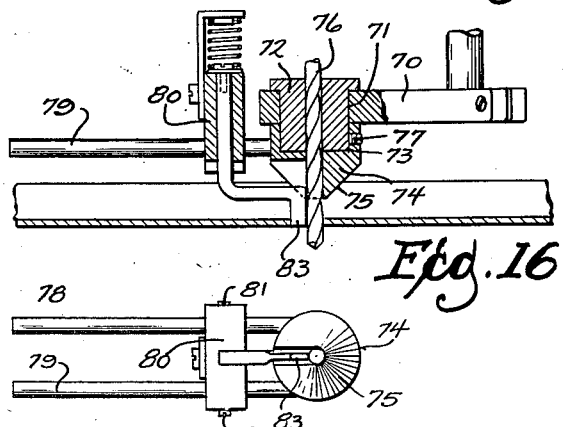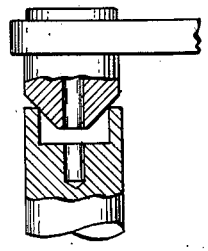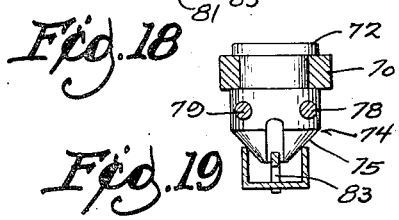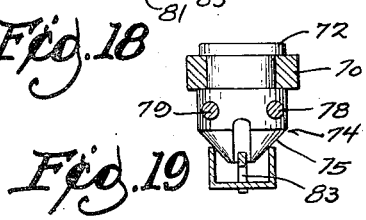

Patented Oct. 7, 1952

2,612,793

UNITED STATES PATENT OFFICE 2,612,793

HOLE SPACING AND CENTERING DEVICE

Henry Timpner, Milwaukee, Wis., assignor of one-half to Robert F. Krainz, Milwaukee, Wis.

Application November 17, 1950, Serial No. 196,298

4 Claims. (Cl. 77—55)

This invention relates to improvements in hole spacing and centering attachments for drilling machines and more particularly to adjustable devices of the type.

An object of the invention is to provide a device of the type including means for hole spacing and centering on shafts or tubes.

Another object of the invention is to provide means for centering a drilling operation in the end of a shaft or the like.

Another object of the invention is to provide a device of the type including stop means for holding a spindle of a hole spacing and centering attachment in a raised position between drilling operations.

Another object of the invention is to provide a device of the type which will space and center holes in a channel or the like.

Other and further objects of the invention will appear as the description proceeds, reference being had to the accompanying drawing, in which:

Fig. 1 is a side view partly in elevation and partly in section of one form of the invention applied to a drilling machine.

Fig. 2 is a plan view taken on line 2—2 of Fig. 1.

Fig. 3 is an inverted plan view thereof.

Fig. 4 is a vertical sectional view taken on line 4—4 of Fig. 1.

Fig. 5 is a view in perspective of a portion of a round rod showing aligned closely proximate drill holes.

Fig. 6 is a fragmentary view in perspective of a hexagonal rod showing holes spaced on an edge thereof.

Fig. 7 is a fragmentary view of a rod square in cross section showing aligned holes spaced in one space thereof.

Fig. 8 is a fragmentary view in perspective of a similar rod showing holes spaced along opposite edges thereof.

Fig. 9 is a side view partly in elevation and partly in section of a modified form of the invention.

Fig. 10 is an end view partly in section taken on line 10—10 of Fig. 9.

Fig. 11 is a vertical sectional view of another modification of the invention.

Fig. 12 is a view taken on line 12—12 of Fig. 11.

Fig. 13 is a fragmentary view in perspective of an end drilled rod.

Fig. 14 is a similar view of a hexagonal rod.

Fig. 15 is a like view of a square rod.

Fig. 16 is a side view in vertical section of another modified form of the invention.

Fig. 17 is a view taken on line 17—17 of Fig. 16.

Fig. 18 is a plan view of said modified form.

Fig. 19 is a view taken on line 19—19 of Fig. 18.

This invention pertains to structures related to those embodied in my prior patent application bearing the Serial No. 182,443, filed August 31, 1950, and comprises an extension 10 subjoined to the feed gauge threaded member 11, and supporting between the nuts 12 and 13 the horizontal bifurcated member 14 which in turn retains the vertical sleeve 15 provided at its upper end with the centrally apertured plug 16 threadingly engaged therewith. A similar apertured plug 17 is threadingly engaged in the lower end of the vertical sleeve 15. A piston 18 is held within the sleeve 15 and is movable vertically through the apertures of said plugs 16 and 17. A collar 19 is fixed by means 20 on the piston 18 to bear against said plug 17 to limit the downward movement of said piston and to retain a coil spring 21 thereon. The upper end 22 of the coil spring 21 bears against the underside of the apertured plug 16.

An annular groove 23 forms an integral cap 24 on the upper end of the piston 18 which may be engaged by an angular rod detent 25 extending upwardly from and held in the bifurcated member 14 by threaded means 26. The detent 25 is employed to maintain the piston 18 and attachments in a raised position away from the work.

An arm 27 is secured on the lower end of the piston 18 by means 28 and is provided with a circular aperture at 29 to accommodate a bushing 30 which is axially vertically bored at 31 to permit passage therethrough of a twist drill 32. A V block 33 is circularly bored in its top at 34 to receive the lower end of the bushing 30 on which it is held by the set screw 35. The V block 33 has a pair of horizontally extending rods 36 and 37 which carry slideably thereon an adjustable block 38, provided with an upwardly yieldable member 39 backed by a coil spring 40 retained by a bracket 41 attached to the block 38 by threaded means 42. The upwardly yieldable member 39 carries a spacer finger 43 which forms a right angle with said member 39 so that it may be adjusted to a position immediately adjacent the bore 31. The spacing finger 43 is held in the member 39 by the set screw 44. The spacer block 38 is provided with the set screws 45 and 46 for fixing the spacer block 38 in a selected position on the rods 36 and 37. The assembly shown in combination with the V block 33 may be used to drill and space holes in a round rod as shown in Fig. 5 where the holes are shown in immediate proximity, in a hexagonal rod as shown in Fig. 6 where the holes are spaced along one of the edges thereof, in a square rod as shown in Fig. 7 where the holes are spaced centrally of one of the faces of said rod, and in Fig. 8 where the holes are shown spaced along the edges of a square rod.

In Fig. 9 a modified form of the invention is shown in which a bushing 50 and V block 51 are combined. The bushing 50 is held for rotative adjustment in an arm 52 fixed to vertical member 53. A rod 54 extends horizontally from the bushing 50 and carries a slideably adjustable spacer block 55 adapted to be fixed on the rod 54 by the threaded means 56 and having the spacer finger 57 depending therefrom. This modification will space holes in a round rod as shown or in the rods shown in Figs. 5 to 8, inclusive.

In the form of the invention shown in Fig. 11, an apertured arm 60 supports a bushing 61 bored axially to admit a twist drill. A cone block 62 engages the lower end of the bushing 61 within its top end at 63 and is releaseably secured thereto by the set screw 64. The cone slot 62 will center a hole bored in the end of a rod 65 when the latter is held within the internal cone at 66 of said block 62. The said block 62 will center a hole bored in a round rod as shown in Fig. 13, a hexagon rod as shown in Fig. 14 and a rod square in cross section as shown in Fig. 15.

In Fig. 16 another modified form of the invention is shown in which an arm 17 is apertured at 71 to accommodate a bushing 72 which has secured to its lower portion 73 a block 74 having an exterior cone at 75 thereof. The bushing 72 and the block 74 are axially bored to permit passage therethrough of a conventional twist drill 76. The block 74 may be releaseably secured to the lower end 73 of the bushing 72 by the set screw 77. The block 74 carries two horizontally extending rods 78 and 79 which in turn carry a slideably adjustable block 80 which may be secured in a selected position by means of the set screw 81 and which carries the spring press spacer arm having the downwardly directed spacer finger 83.

In use, the arm 27 may be raised against the pressure of spring 21 until the cap 24 is caught under the top end of the detent 25. With the assembly thus raised out of the way, the work can be secured in place for drilling. The block 38 can then be positioned on the rods 36 and 37, depending on where it is desired that the spacer finger 43 be positioned in relation to the path of the twist drill 32. When the desired adjustment is had, the block 38 can be secured on said rods by tightening the threaded means 45 and 46. When the first hole is drilled, the spacer finger 43 and element 39 will yield upwardly against the pressure of the spring 40, but after the first hole has been made, the spacer finger 43 is inserted therein, and the second hole is then drilled, and the process repeated until the requisite number of spaced holes has been drilled. The special construction of spacer finger 43 permits the drilling of immediately adjacent apertures, so that a slot could be made in a round rod, in cooperation with the V block 33. The V block also handles square and hexagonal rods with equal facility.

In the form of the invention shown in Fig. 9, the combined bushing and V block and spacer block assembly may be used to space holes. In the form of the invention shown in Fig. 11 a rod of any shape in cross-section, presented endwise to the internal cone block may be centrally drilled with a maximum of accuracy.

In the form of the invention shown in Fig. 16, the external cone block permits accurate center drilling and spacing of holes in channel formed elements or the like.

It will be understood that the device is capable of many modifications in structure and design, without departing from the spirit of the invention, within the scope of the appended claims.

Having thus described the invention, what is claimed and desired to be secured by Letters Patent of the United States, is:

1. In combination with a bushing, a block centrally releasably attached thereunder, centering means embodied in the work-facing lower surfaces of said block, lateral guide means fixed to said block, a spacer block thereon, a spacer finger yieldably fixed to said spacer block adapted to successively engage holes to be drilled, and means for releasably fixing said spacer block on said guide means.

2. In combination with a bushing bored to accommodate a twist drill, a block centrally releasably attached thereunder, inverted V faces on the lower side of said block to center an article of work engaged thereby, parallel guide means fixed to said block, a spacer block movable on said guide means, a yieldable spacer finger on said spacer block, and means for releasably fixing said spacer block on said guide means.

3. A centering block axially drilled to accommodate a twist drill, the lower portion of said block having an external forty-five degree angled cone formation adapted to center drill holes in channel forms and the like.

4. In combination with a bushing bored to accommodate a twist drill, a centering block centrally releasably attached thereunder having a laterally extending slot in its under side, parallel horizontal guide means on the latter, a spacer block movable on the guide means, a yieldable spacer finger angularly bent to extend into the slot of said centering block adapted to successively engage holes to be drilled, and means for releasably fixing said spacer block on said guide means.

HENRY TIMPNER.

REFERENCES CITED

The following references are of record in the file of this patent:

UNITED STATES PATENTS

| Number | Name | Date |
|---|---|---|
| 447,014 | Pryibil | Feb. 24, 1891 |
| 2,224,480 | Kartarik | Dec. 10, 1940 |
| 2,349,142 | Christenson | May 16, 1944 |
| 2,418,956 | Silner | Apr. 15, 1947 |

FOREIGN PATENTS

| Number | Country | Date |
|---|---|---|
| 356,942 | Great Britain | Sept. 17, 1931 |